United States Patent Office 3,790,513
Patented Feb. 5, 1974

3,790,513
THERMOSETTING ACRYLIC POLYMER POWDER
COATING COMPOSITIONS
Claus Victorius, Media, Pa., assignor to E. I. du Pont
de Nemours and Company, Wilmington, Del.
No Drawing. Filed Dec. 27, 1971, Ser. No. 212,738
Int. Cl. C08g 37/32
U.S. Cl. 260—15      10 Claims

ABSTRACT OF THE DISCLOSURE

The thermosetting acrylic polymer powder coating composition comprises finely divided particles having a diameter of 1–100 microns wherein the product particles are a bend of (A) 70–95% by weight of an acrylic polymer of methyl methacrylate, a soft constituent which is either an alkyl acrylate or an alkyl methacrylate having 2–12 carbons in the alkyl group, a hydroxy alkyl acrylate or a hydroxy alkyl methacrylate having 2–4 carbon atoms in the alkyl groups, and an $\alpha,\beta$-ethylenically unsaturated carboxylic acid such as methacrylic acid that has at least 50% of the carboxyl groups neutralized with an aliphatic amine having a given boiling point range;
(B) 5–30% by weight of an alkylolated melamine formaldehyde;

the powder composition can contain pigments and dyes;

The novel thermosetting acrylic polymer powder coating composition is particularly useful as an exterior finish for automobiles and trucks.

BACKGROUND OF THE INVENTION

This invention is related to powder coating compositions and in particular, to thermosetting acrylic polymer powder coating compositions.

Thermosetting powder coating compositions of epoxy resin are well known in the art as shown in Elbling U.S. Pat. 3,039,987, issued June 19, 1962 and Winthrop et al. U.S. Pat. 3,102,043, issued Aug. 27, 1963. Powders of pigmented acrylic polymers have been used as toners for imaging systems as shown in Walkup et al. U.S. Pat. 2,638,416, issued May 12, 1953 and Clemens et al. U.S. Pat. 3,502,582, issued Mar. 24, 1970. Thermosetting powder coating compositions of an epoxy resin, a polyvinyl acetal and a polyacrylate resin are disclosed in Flowers et al. U.S. Pat. 3,058,951, issued Oct. 16, 1962. In general, epoxy powder coatings have poor outdoor durability and thermosetting acrylic powders have a poor appearance caused by popping and inadequate flow of the finish during baking which makes the compositions unacceptable as exterior finishes for automobile and truck bodies.

The automobile and truck manufacturing industry intends to utilize powder coating compositions to curb pollution and the industry demands that these compositions be of a high quality. The novel thermosetting acrylic polymer powder coating composition of this invention provides a high quality, smooth, glossy, durable finish having an excellent appearance that is required for truck and automobile exterior finishes.

SUMMARY OF THE INVENTION

The thermosetting acrylic polymer powder coating composition of this invention comprises finely divided particles that have a particle size of 1–100 microns; the powder particles are intimately mixed film-forming constituents consisting essentially of (A) 70–95% by weight of an acrylic polymer consisting essentially of
   (1) 30–83% by weight of methyl methacrylate,
   (2) 10–50% by weight of a soft constituent which can be either an alkyl acrylate or an alkyl methacrylate having 2–12 carbon atoms in the alkyl groups,
   (3) 5–20% by weight of a hydroxy containing compound that can either be a hydroxy alkyl acrylate or a hydroxy alkyl methacrylate having 2–4 carbon atoms in the alkyl groups,
   (4) 2–8% by weight of an ethylenically unsaturated monocarboxylic acid that has at least 50% of the carboxyl groups neutralized with an aliphatic amine that has a boiling point of about 200–275° C.;
wherein the acrylic polymer has a glass transition temperature of about 40–70° C. and the polymer has a relative viscosity of 1.05–1.20 measured at 0.5% polymer solids at 30° C. in methylethyl ketone;
(B) 5–30% by weight of an alkylolated melamine formaldehyde having a ratio of —$CH_2OR$ groups to —$CH_2OH$ groups of at least 5:1 where R is an alkyl group having 1–8 carbon atoms.

DESCRIPTION OF THE INVENTION

The novel thermosetting acrylic powder coating composition of this invention has powder particles that preferably are 10–75 microns in diameter and have a glass transition temperature of about 40–60° C.

The glass transition temperature of the powder particles is the temperature at which the viscosity of the material is $10^{13}$ poises.

The powder particles can be pigmented or unpigmented but usually contain about 0.2–50% by weight of pigment. Any of the conventional inorganic pigments, organic pigments, dyes and lakes can be used.

About 70–95% by weight, based on the weight of the film-forming constituents inthe powder coating composition, of an acrylic polymer is utilized and preferably about 80–90% by weight of the acrylic polymer is used. The acrylic polymer has a relative viscosity of about 1.05–1.20, and preferably, about 1.06–1.10.

The relative viscosity is the value obtained by dividing the efflux time of the solution of the polymer by the efflux time of the solvent used to form the above polymer solution. The efflux times are measured according to the procedure of ASTM-D-445-46-T, Method B, using as the polymer solution 0.5 gram of the polymer dissolved in methylethyl ketone to give 50 cubic centimeters of solution. The efflux times are measured at 30° C. in a standard apparatus sold under the designation of modified Ostwald viscometer.

The acrylic polymer is prepared by conventional solution, emulsion or bead polymerization techniques and by using conventional polymerization catalysts.

The acrylic polymer can be prepared by conventional solution polymerization techniques in which the monomer constituents are blended with solvents and a polymerization catalyst and the reaction mixture is heated to 55–150° C. for about 2–6 hours to form a polymer that has a weight average molecular weight of about 10,000–50,000.

Typical solvents which are used to prepare the acrylic polymer are toluene, ethyl acetate, acetone, methylisobutyl ketone, methylethyl ketone, ethyl alcohol, and other aliphatic cycloaliphatic and aromatic hydrocarbons, esters, ethers, ketones, and alcohols, such as are conventionally used. Solvents having a boiling point below 100° C. are preferred to facilitate spray drying of the composition to form the novel powder coating composition.

About 0.1–4% by weight, based on the weight of the monomers, of a polymerization catalyst is used to prepare the acrylic polymer. Typical catalysts are azo-bis($\alpha$, gamma-dimethyl-valeronitrile), benzoyl peroxide, t-butyl peroxy pivalate, azobisisobutyronitrile and the like. Up to about 5% by weight of a chain transfer agent can be used to control molecular weight such as dodecyl mercaptan or benzenethiol.

The acrylic polymer can be prepared by an emulsion polymerization process in which the monomers and an aqueous solution of a free radical catalyst are simultaneously and continuously fed into a polymerization vessel containing water, and a suitable emulsifying agent. The polymerization is carried out in a vessel equipped with a reflux condenser, preferably, under an inert atmosphere, utilizing polymerization temperatures of about 20–90° C. Typical free radical catalysts that can be used are as follows: potassium persulphate, water-soluble peroxides, such as hydrogen peroxide. A redox type catalyst such as a mixture of ammonium persulfate and sodium bisulfite, is preferred. If a redox catalyst is used, 0.1–5 parts per million of iron, based on the weight of water, in the form of a soluble iron salt such as ferrous sulfate should be added to the reaction mixture. Any active anionic or non-ionic surfactant or combination thereof can be used as an emulsifying agent. An ammonium or volatile amine salt of a sulfated or sulfonated surfactant, such as ammonium lauryl sulfate, is preferred.

The acrylic polymer can also be prepared by suspension or bead polymerization techniques as disclosed in W. R. Sorenson and T. W. Campbell, "Preparative Methods of Polymer Chemistry," Interscience Publishers, New York, 2nd ed. 1968, page 254.

The acrylic polymer utilized in the novel powder coating composition of this invention contains about 30–83% by weight of methyl methacrylate, 10–50% by weight of an alkyl acrylate or an alkyl methacrylate or a mixture thereof in which the alkyl groups contain 2–12 carbon atoms, 5–20% by weight of a hydroxy alkyl acrylate or methacrylate having 2–4 carbon atoms in the alkyl group and 2–8% by weight of an $\alpha,\beta$-ethylenically unsaturated monocarboxylic acid.

Typical alkyl acrylates, alkyl methacrylates having 2–12 carbon atoms that can be used to prepare the acrylic polymer are ethyl acrylate, propyl acrylate, isopropyl acrylate, butyl acrylate, isobutyl acrylate, hexyl acrylate, 2-ethylhexyl acrylate, nonyl acrylate and lauryl acrylate, ethyl methacrylate, propyl methacrylate, butyl methacrylate, hexyl methacrylate, 2-ethylhexyl methacrylate, nonyl methacrylate and lauryl methacrylate.

Typical hydroxy alkyl acrylates and methacrylates which can be used to prepare the acrylic polymer are 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, and the like.

Typical $\alpha,\beta$-ethylenically unsaturated monocarboxylic acids are acrylic acid and methacrylic acid.

One particularly useful type of acrylic polymer contains 60–75% by weight of methyl methacrylate, 10–30% by weight of alkyl acrylate, 5–12% by weight of hydroxyethyl acrylate, and 2–5% by weight of methacrylic acid or acrylic acid. Typical acrylic polymer of this type are methyl methacrylate/ethyl acrylate/2-hydroxyethyl acrylate/methacrylic acid, weight ratio 67/23/7/73; methyl methacrylate/ethyl acrylate/2-hydroxyethyl acrylate/methacrylic acid, weight ratio 72/17/7/3; methyl methacrylate/ethyl acrylate/2-hydroxyethyl acrylate/methacrylic acid, weight ratio of 70/20/7/3; methyl methacrylate/butyl acrylate/2-hydroxyethyl acrylate/methacrylic acid in a weight ratio of 70/20/7/3.

In the above acrylic polymers, up to 50% by weight of the methyl methacrylate may be replaced with styrene and still form useful polymer compositions. However, methyl methacrylate is the preferred constituent.

About 5–30% by weight, based on the weight of the film-forming constituents, of an alkylolated melamine formaldehyde having 1–8 carbon atoms in the alkyl group is used in the novel powder coating composition of this invention. These alkylolated melamine formaldehyde resins are those that are well known in the art and are prepared by conventional techniques in which a lower alkyl alcohol such as methanol, ethanol, butanol, isobutanol, propanol, isopropanol, and the like, is reacted with the melamine formaldehyde to provide pendent alkoxy groups. The ratio of the —$CH_2OR$ groups to the —$CH_2OH$ groups of the alkylolated melamine formaldehyde should be at least 5:1. R is an alkyl group having 1–8 carbon atoms and is from the lower alkyl alcohol used to prepare the alkylolated melamine formaldehyde. Another useful alcohol is 2-butoxy ethanol.

One particularly preferred melamine used in this invention because of its stability in the powder and since it forms a high quality coating is hexa(methoxymethyl) melamine. "Cymel" 300 is one highly preferred hexa(methoxymethyl) melamine that can be used to form a powder coating composition with excellent resistance to popping.

Up to about 25% by weight of the film-forming constituents of the novel powder coating composition of this invention of cellulose acetate butyrate can be used. Preferably, the cellulose acetate butyrate has a butyryl content of 30–60% by weight and a viscosity of 0.1–6 seconds measured according to ASTM–D–1343–56. One useful cellulose acetate butyrate that can be used in this invention has a butyryl content of about 35–45% by weight and a viscosity of 1–2 seconds. The cellulose acetate butyrate gives the composition flow characteristics and improved gloss. Small amounts of high butyryl containing cellulose acetate butyrates can be used for cratering resistance such as 2% by weight of cellulose acetate butyrate having a butyryl content of about 55% by weight and a viscosity of about 0.2 second.

Organic plasticizers can be used in the novel powder coating composition of this invention in the amount of 1–20% by weight based on the weight of the powder coating composition. The plasticizer should be chosen to provide the powder particles with a glass transition temperature within the aforementioned range.

Monomeric and polymeric plasticizers can be used in the novel powder coating compositions of this invention. Phthalate ester plasticizers in particular the alkyl and cycloalkyl ester phthalates in which the alkyl group has 2–10 carbon atoms can be used such as diethyl phthalate, dibutyl phthalate, butylbenzyl phthalate, dicyclohexyl phthalate, and mixtures thereof. Other esters such as diethyl adipate and sucrose benzoate can also be used.

Polyester resins can also be used as plasticizers. Typical polyesters are, for example, alkylene glycol esters of adipic and benzoic acid such as ethylene glycol adipate benzoate, neopentyl glycol adipate benzoate, ethylene glycol adiphate benzoate phthalate and the like. Plasticizers of oil free or oil modified alkyd resins and polyesters and epoxidized soya bean oil can also be used.

Mixtures of the above polymeric plasticizers and monomeric plasticizers can be used such as a mixture of ethylene glycol adipate benzoate and diethyl phthalate, neopentyl glycol adipate benzoate and dibutyl phthalate and the like.

A silicone resin can be added to the novel powder coating composition of this invention to enhance flow and reduce cratering. Any of the conventional silicone resins or oils in amounts of 0.01–2% by weight can be used for this purpose.

Generally pigments are used in a powder coating composition of this invention in amounts of 0.2–50% by weight of the powder particles. Examples of the great variety of pigments which can be used in the novel powder coating composition of this invention are metallic oxide, preferably titanium dioxide, zinc oxide, iron oxide, and the like, metallic flake, metallic powders, metal hydroxides, "Afflair" pigments, for example, mica flake coated with titanium dioxide, sulfides, sulfates, carbonates, carbon black, silica, talc, china clay, and other pigments, organic dyes and lakes.

The novel powder coating composition of this invention is prepared by neutralizing the acrylic polymer solution or emulsion with an aliphatic amine such that at least 50% of the carboxyl groups of the acrylic polymer are neutralized. The aliphatic amine should have a boiling point of about 200–275° C. Typical aliphatic amines are, for example, 2-dibutylaminoethanol, methyldiethanolamine, diethanolamine, diisopropanolamine, tributylamine and N,N-dimethyldodecylamine. Surprisingly and unexpectedly this partial or complete neutralization substantially eliminates popping in finishes prepared from the novel powder coating composition of this invention. Popping and poor appearance has plagued prior art powder compositions.

After the polymer solution or emulsion is neutralized, the alkylolated melamine formaldehyde is added along with pigments, pigment dispersions and other additives, such as the aforementioned plasticizers, cellulose acetate butyrate, and the like.

The pigment dispersion can be prepared by conventional techniques such as sand grinding or pebble milling the acrylic polymer solution or dispersion with pigments.

A two-roll mill can be used to prepare pigment chips which are formed into a pigment dispersion. Generally, pigments and cellulose acetate butyrate or the acrylic polymer along with a volatile non-solvent for the polymer and plasticizers are blended together and then the mixture is placed on a two-roll mill and the mixture is thoroughly milled to disperse the pigments and to form pigment chips. These chips are then dissolved in a solvent and blended with the acrylic polymer solution and the other additives.

One method for forming a powder composition from the above prepared mixture is to charge the mixture into a vacuum extruder which flashes off the solvent or water and leaves a solid material which is then ground into powder particles. Commercial spray drying equipment can also be used for this technique. The powder is then passed through a sieve with openings of about 75 microns to remove large particles.

In another technique, the above prepared solution or dispersion can be charged into a vacuum extruder. The extruder is operated under a vacuum of about 22–25 inches of mercury, preferably, 10–15 inches in mercury, and the solvent or water is removed from the composition and a 100% solids extrudate is produced. The extrudate is then reduced to a powder using conventional grinding equipment, for example, a pin disc mill, a fluid energy mill or a hammer mill can be used. After grinding, the powder is passed through a sieve to remove large particles. Usually a 200-mesh sieve (74-micron size) is used.

A two-roll mill can also be used to disperse the pigment chips or pigment dispersion in the acrylic polymer dispersion or solution and the other additives. This composition is then ground to form the novel powder coating composition.

About 0.1–2.0% by weight of finely divided silica can be blended with the novel powder coating composition of this invention to eliminate caking of the powder and improve its handling and spraying properties.

The novel powder coating composition of this invention is then applied to a metal, glass, plastic or fiber reinforced plastic substrate by electrostatic spraying techniques or by using a fluidized bed or an electrostatic fluidized bed. Preferably, electrostatic spraying is utilized in which a voltage of 20 to 60 kilovolts is applied to the gun. The composition is applied in several passes to a thickness of 0.5–6 mils, preferably 2–3 mils, and then baked at 150–180° C. for 15–30 minutes.

Preferably, the novel coating composition of this invention is applied over a suitably treated and primed metal substrate. Typical alkyd primers or epoxy primers pigmented with iron oxide, carbon black, titanium dioxide and the like can be used. Also, the novel composition can be used directly over galvanized or phosphatized steel to form a durable coating. An electrically conductive carbon black pigment can be added to the primer to make the surface conductive and promote uniform deposition of the powder while spraying.

Electrodeposited primers can be used on the metal substrate. Typical electrodeposited primer compositions have as the film-forming constituents about 50–95% by weight of a carboxylic acid polymer having an acid number of 5–200 and correspondingly about 5–50% by weight of a cross-linking agent.

The following are examples of carboxylic polymers used in these primer compositions; maleinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as, drying oil fatty acids; esterified epoxy resins such as, an epoxy-hydroxy polyether resin esterified with conventional drying oil fatty acid which can be further acidified with maleinized drying oils; acrylic polymers; polyesters; trimellitic anhydride alkyd resins; styrene/allyl alcohol copolymers reacted with a carboxylic acid constituent and the like.

The following are typical cross-linking agents used with the above carboxylic polymers to form conventional primers and primers that can be electrodeposited: melamine formaldehyde, alkylolated melamine formaldehyde, urea formaldehyde, benzoguanamine formaldehyde, toluene sulfonamide resins; one preferred cross-linking agent is hexa(methoxymethyl)melamine. Other cross-linking agents such as, amines and other compatible hydroxyl terminated compounds can also be used.

The following examples illustrate the invention. All quantities are on a weight basis unless otherwise indicated.

EXAMPLE 1

A copolymer emulsion is prepared as follows:

| | Parts by weight |
|---|---|
| Portion 1: | |
| Ionic surfactant solution (30% aqueous solution of ammonium lauryl sulphate) | 26.70 |
| Ferrous sulphate solution (0.0498% aqueous solution of $FeSO_4 \cdot H_2O$) | 21.00 |
| Distilled water | 1156.00 |
| Portion 2: | |
| Methyl methacrylate monomer | 1072.00 |
| Ethyl acrylate monomer | 368.00 |
| 2-hydroxy ethyl acrylate monomer | 112.00 |
| Methacrylic acid monomer | 48.00 |
| 1-dodecanethiol | 32.00 |
| Portion 3: | |
| Ammonium persulfate | 7.41 |
| Sodium bisulfite | 2.48 |
| Distilled water | 904.30 |
| Total | 3749.89 |

Portion 1 is charged into a reaction vessel equipped with a thermometer, nitrogen inlet, a stirrer, a reflux condenser and two dropping funnels. Portion 2 is charged into one of the dropping funnels while Portion 3 is charged into the other dropping funnel. Portion 1 is heated to 88° C. Then Portion 2 is slowly added at a rate of 19 parts by weight per minute along with Portion 3 which is added at a rate of 10 parts by weight per minute. The reaction mixture is maintained at about 87–89° C. during the addition of Portions 2 and 3. After Portions 2 and 3 have been added, the reaction mixture is maintained at 87–90° C. for an additional hour. The resulting polymer emulsion is cooled to room temperature and filtered.

The polymer emulsion has a polymer solids content of 42.7%. The polymer consists of methyl methacrylate/ethyl acrylate/2-hydroxyethyl acrylate/methacrylic acid in a weight ratio of 67/23/7/3 and the polymer has a relative viscosity of 1.101 measured at 0.5% polymer solids in methylethyl ketone at 30° C. The calculated glass transition temperature of the polymer is 56° C.

The dispersion is then neutralized and blended with hexa(methoxymethyl)melamine as follows:

| | Parts by weight |
|---|---|
| Portion 1: | |
| Copolymer dispersion (prepared above) | 210.8 |
| Portion 2: | |
| Diethanol amine solution (50% aqueous solution) | 1.0 |
| Portion 3: | |
| 2-dibutylaminoethanol | 5.3 |
| Portion 4: | |
| "Cymel" 303-[hexa(methoxymethyl)melamine] | 10.0 |
| Total | 227.1 |

Portion 1 is charged into a reaction vessel equipped with a stirrer and then Portion 2 is added drop-wise with constant agitation. Then Portion 3 is added drop-wise with constant agitation. Portion 4 is then added and the ingredients are stirred for 30 minutes and then filtered. The resulting composition has a pH of 8.15.

The above vehicle composition is placed in a open pan and then dried in a circulating air oven held at 30° C. giving a solid cake of resin. The solid cake of resin is ground in a laboratory blender, then passed through a 200-mesh sieve. The above prepared powder is blended with 0.1% by weight of finely divided silica by thoroughly shaking the powder and the silica for 30 minutes on a conventional shaking machine. The resulting powder is then placed in a vacuum oven and dried to a constant weight.

The powder is then sprayed onto a 20-gauge phosphatized steel panel using a Model 322 Ransburg Electrostatic Powder Gun. The powder is delivered from a reservoir to the gun by means of a stream of air. The gun utilized 40 kilovolts of electricity to charge the powder particles and 60 pounds per square inch air pressure. The panels are baked for 30 minutes at 150° C. The film on the panel is clear, and has a good appearance, and is free of popping and cratering tnd has a fine, orange peel surface which is acceptable. The thickness of the film is 2.0–2.4 mils and the film has a hardness of 14 Knoops. The film has excellent resistance to aromatic solvents.

EXAMPLE 2

A copolymer emulsion is prepared using the identical procedure as in Example 1 except the monomer constituents are varied as follows: methyl methacrylate/ethyl acrylate/2-hydroxyethyl acrylate/methacrylic acid weight ratio of 72/18/7/3. The resulting emulsion has a polymer solids content of 43.5%. The polymer has a relative viscosity of 1.10 measured as in Example 1 and a calculated glass transition temperature of 64° C.

The neutralized copolymer dispersion is prepared as follows:

| | Parts by weight |
|---|---|
| Portion 1: | |
| Copolymer dispersion (prepared above) | 2775.0 |
| Portion 2: | |
| 50% aqueous solution of methyl diethanolamine | 100.2 |
| Total | 2875.2 |

The amine solution is slowly added to the polymer dispersion with constant agitation of the polymer dispersion. After the amine dispersion has been added, the resulting composition is filtered through a 200 mesh nylon cloth. The pH of the resulting composition is 8.83.

The neutralized copolymer dispersion is then blended with hexa(methoxymethyl)melamine as follows:

| | Parts by weight |
|---|---|
| Neutralized copolymer dispersion (prepared above) | 213.5 |
| "Cymel" 303 (described in Example 1) | 10.0 |
| Total | 223.5 |

The "Cymel" 303 is added to the neutralized copolymer dispersion and the composition is stirred for 30 minutes. The composition is then placed in an open container and then dried in a circulating air oven held at 35° C. The resulting cage is ground in a laboratory blender and then passed through a 20-mesh sieve and then dried further in the 35° C. oven. The composition is then ground and passed through a 200-mesh sieve.

The above powder is blended with 0.1% by weight of finely divided silica and the constituents are blended as in Example 1. The resulting composition is dried in a vacuum oven to a constant weight.

The resulting powder coating composition is sprayed as in Example 1 on phosphatized steel panels and then baked for 30 minutes at 150° C. The resulting film is 3.0–3.4 mils thick and is clear and has a 20° gloss of 51. The film is also free of popping and cratering and is not softened by an aromatic solvent such as xylene. The hardness of the film is 14 Knoops.

A pigmented powder coating composition is then prepared as follows:

| | Parts by weight |
|---|---|
| Neutralized copolymer dispersion (prepared above) | 223.50 |
| White mill base (56.25% TiO$_2$ pigment, 3.75% of methyl methacrylate/ethyl acrylate/acrylic acid copolymer, weight ratio 60/25/5, 100% neutralized with methyl diethanolamine dispersed in 40% by weight water) | 8.00 |
| Blue mill base (28.12% phthalocyanine blue, 1.88% methyl methacrylate/ethyl acrylate/acrylic acid copolymer, weight ratio 60/25/5, 100% neutralized with methyl diethanolamine dispersed in 70% by weight water) | 6.22 |
| Black mill base (12.5% carbon black dispersed in 87.5% of a ¾ isopropanol/water solution) | 0.40 |
| Total | 238.12 |

The above ingredients are stirred together for 30 minutes, filtered and then dried in a circulating air oven at 35° C., then the resulting cake is ground and passed through a 200-mesh sieve. The powder coating composition is blended with 0.1% by weight of finely divided silica and the resulting composition is dried to a constant weight in a vacuum oven.

The pigmented powder coating composition is then applied to phosphatized steel panels and to steel panels primed with a standard alkyd resin body primer pigmented with iron oxide. The identical coating conditions are used as in Example 1 except 50 kilovolts of electricity are used on the gun. The resulting coated panels are baked for 30 minutes at 150° C. The resulting films have a good appearance and did not exhibit popping or cratering. The 20° gloss for the phosphatized steel panels is 52 and for the alkyd primed panels 20° gloss is 46. The hardness of both of the films is about 16 Knoops.

The powder was subjected to a constant temperature of 40° C. for sixteen hours and remained a usable powder and did not fuse or coalesce which indicates the powder is stable for commercial use.

EXAMPLE 3

A polymer solution is prepared as follows:

| | Parts by weight |
|---|---|
| Portion 1: | |
| Methyl methacrylate monomer | 1260.0 |
| Eethyl acrylate monomer | 360.0 |
| 2-hydroxyethyl acrylate | 126.0 |
| Methacrylic acid | 54.0 |
| 1-dodecanethiol | 18.0 |
| Azo-bis(α,gamma-dimethylvaleronitrile) | 18.0 |
| Acetone | 1200.0 |
| Portion 2: | |
| Azo-bis(α-gamma-dimethylvaleronitrile) | 9.0 |
| Acetone | 270.0 |
| Total | 3315.0 |

Portion 1 is charged into a reaction vessel equipped with a stirrer, a thermometer, a reflux condenser, a dropping funnel and a nitrogen inlet. Portion 1 is heated to its reflux temperature and held at this temperature for about 1 hour, then about ⅔ of Portion 2 is added with constant agitation and the reaction mixture is held at its reflux temperature for an additional 1 hour. The remainder of Portion 2 is then added and the reaction mixture is held at its reflux temperature for an additional 4½ hours and the reaction mixture is then cooled to room temperature. The resulting polymer solution has a 52.4% polymer solids content. The polymer consists of methyl methacrylate/ethyl acrylate/2-hydroxyethyl acrylate/methacrylic acid in a weight ratio of 70/20/7/3 and the polymer has a relative viscosity of 1.081 measured at 0.5% polymer solids at 30° C. in methylethyl ketone. The polymer has a calculated glass transition temperature of 60° C.

The polymer solution is then blended with a cross-linking agent as follows:

| | Parts by weight |
|---|---|
| Polymer solution (prepared above) | 515.3 |
| "Cymel" 303 [hexa(methoxymethyl)melamine] | 30.0 |
| Methylene chloride | 462.0 |
| Total | 1007.6 |

The above ingredients are mixed together to form a composition having a solids content of 29.8% and a viscosity of 38.5 seconds measured in a No. 1 Zahn Cup.

A portion of the above solution is then neutralized as follows:

| | Parts by weight |
|---|---|
| Above unneutralized solution (29.8% solids) | 329.5 |
| Methyl diethanolamine | 3.8 |
| Total | 333.3 |

Both the unneutralized polymer solution and the neutralized polymer solution are each separately spray dried by spraying the solution with a suction type spray gun at 80 pounds per square inch into a 50-gallon drum that is open at both ends and placed in a horizontal position. One end of the drum is covered with a 140-mesh nylon cloth to catch the powder particles and the other end of the drum is covered with polyethylene having a small hole therein through which the powder is sprayed. In each case, the powder is white and the powder particles are relatively uniform and non-sticky. Each of the powders is placed into a vacuum oven and dried overnight.

Each of the powders is blended with 0.1% by weight of finely divided silica and each of the compositions is then dried in a circulating air oven at 30° C. Each of the compositions is then passed through a 200-mesh sieve to remove large particles.

Each of the compositions is applied to a phosphatized steel panel using the procedure of Example 1 and the panels are baked at about 175° C. for about 30 minutes.

The resulting film from the unneutralized polymer is hazy white and dull due to popping and has an unacceptable appearance, while the film from the neutralized polymer is free from bubbles and popping and gives a smooth film with a gloss at 20° of about 69 and a hardness of about 15 Knoops.

EXAMPLE 4

A polymer solution is prepared as follows:

| Portion 1: | Parts by weight |
|---|---|
| Methyl methacrylate monomer | 1260.0 |
| Ethyl acrylate monomer | 360.0 |
| 2-hydroxyethyl acrylate | 126.0 |
| Methacrylic acid monomer | 54.0 |
| 1-dodecanethiol | 21.6 |
| Methylethyl ketone | 692.0 |
| Acetone | 414.0 |
| Portion 2: | |
| Azo-bis-isobutyronitrile | 21.6 |
| Methylethyl ketone | 274.0 |
| Total | 3223.2 |

Portion 1 is charged into a reaction vessel equipped with a stirrer, a reflux condenser, a dropping funnel and a nitrogen inlet and then heated to 78° C. while maintaining the reaction mixture under constant agitation. One-half of Portion 2 is then added and the reaction mixture is refluxed for about 1 hour. Then one-sixth of Portion 2 is added and the reaction mixture is refluxed for an additional hour and then an additional one-sixth of Portion 2 is added and the reaction mixture is then refluxed an additional 1½ hours. Then the remainder of Portion 2 is added and the reaction mixture is held at its reflux temperature for an additional two hours. The reaction mixture is then cooled to room temperature. The resulting polymer solution has a 55.6% solids content and the solution is then thinned to a 35% polymer solids content with methylene chloride. The polymer has a relative viscosity of 1.078 measured at 0.5% polymer solids at 30° C. in methylethyl ketone. The polymer has a calculated glass transition temperature of 60° C.

A blue mill base is prepared as follows:

| Portion 1: | Parts by weight |
|---|---|
| Toluene/VM and P naphtha solution (55/45 volume ratio) | 313.0 |
| Distilled water | 15.0 |
| Butylbenzyl phthalate | 30.0 |
| Portion 2: | |
| Cellulose acetate butyrate having a 38% butyryl content and a 2 sec. viscosity | 150.0 |
| Portion 3: | |
| Phthalocyanine blue pigment | 120.0 |
| Total | 628.0 |

Portion 1 is charged into a vessel and then mixed and Portion 2 is slowly added and mixed with Portion 1 and then Portion 3 is slowly stirred into the mixture. The resulting mixture is placed on a heated 2-roll mill having one roll heated at 110° C. and the other roll at about 40° C. with an 8–10 mil nip clearance and the mixture is milled for about 30 minutes. The resulting chips are then reduced with solvents as follows:

| | Parts by weight |
|---|---|
| Portion 1: | |
| Pigment chips (prepared above) | 105 |
| Toluene | 105 |
| Portion 2: | |
| Toluene | 133 |
| Methylethyl ketone | 357 |
| Total | 700 |

Portion 1 is charged into a container and agitated for 30 minutes and then Portion 2 is added and the composition is then agitated for an additional two hours and placed on rollers for a 16 hours period to further blend the constituents together. The compoistion is then thinned with a 60/40 methylethyl ketone/toluene solvent mixture to a 13% solids content and then agitated for an additional 1 hour.

A white mill base is prepared as follows:

| | Parts by weight |
|---|---|
| Portion 1: | |
| Butylbenzyl phthalate | 30.0 |
| Toluene/VM and P naphtha (55/45 volume ratio) | 240.0 |
| Distilled water | 15.0 |
| Portion 2: | |
| Cellulose acetate butyrate (38% butyryl content, 2 sec. viscosity) | 150.0 |
| Portion 3: | |
| Titanium dioxide pigment | 120.0 |
| Total | 555.0 |

Portion 1 is charged into a vessel and then mixed and Portion 2 is slowly added and mixed with Portion 1 and then Portion 3 is slowly added and blended with the mixture. The resulting mixture is then placed on a heated two-roll mill (described above) and milled for 30 minutes. About 560 parts of the resulting chips are blended with 1040 parts of a methylethyl ketone/toluene 70/30 mixture and mixed over a 16-hour period, placing the ingredients in a can which is placed on a conventional mixing roll. The ingredients then are blended with 211 parts of toluene and 56 parts of methylethyl ketone and mixed together for about 30 minutes, placed on a conventional roll and blended for 12 hours, and then the container is placed in a conventional paint shaker for an additional three hours to thoroughly blend the ingredients together.

A green mill base is prepared using the identical ingredients and procedure used to prepare the above blue mill base, except phthalocyanine green pigment is substituted for the phthalocyanine blue pigment but the mill base is not thinned and has a solids content of about 15%.

A powder coating composition is prepared as follows:

| | Parts by weight |
|---|---|
| Polymer solution (prepared above) (35% solids) | 4415.3 |
| Methyl diethanolamine | 64.2 |
| "Cymel" 303 [hexa(methoxymethyl)melamine] | 188.0 |
| Cellulose acetate butyrate solution (25% solution of cellulose acetate butyrate having a 55% butyryl content and a 0.2 second viscosity in methylethyl ketone) | 150.4 |
| Green mill base (prepared above) | 35.3 |
| Blue mill base (prepared above) | 589.0 |
| White mill base (prepared above) | 704.6 |
| Total | 6146.8 |

The above ingredients are added in turn to a mixing vessel and then blended together with constant agitation and the resulting composition is thinned with methylene chloride to a 40-second viscosity measured in a No. 1 Zahn Cup. The composition is filtered and then spray dried using the procedure described in Example 3. The resulting blue powder is dried in a vacuum oven while maintaining a 30° C. temperature over a 16 hour period and then is passed through a 20-mesh sieve. The resulting powder is blended with 0.1% by weight of a finely divided silica and the resulting powder is then passed through a 230-mesh sieve to remove large particles. The powder has excellent stability to aging and withstands a temperature of 40° C. for an indefinite period of time.

Steel panels primed with a conventional alkyd resin iron oxide primer are then electrostatically coated with the novel powder composition prepared above using the identical procedure of Example 1. The panels are then baked fo 30 minutes at about 175° C. The resulting film is about 2.4 mils thick, has a 20° gloss of 73, a good distinctness of image, a Tukon hardness of 16 Knoop, acceptable tape adhesion, excellent gasoline resistance and resistance to aromatic solvents. The coating is acceptable for use as a finish on automobiles and trucks and does not exhibit paint popping, sagging and cratering.

EXAMPLE 5

A polymer solution is prepared as follows:

| | Parts by weight |
|---|---|
| Portion 1: | |
| Methyl methacrylate monomer | 1260.0 |
| Butyl acrylate monomer | 360.0 |
| 2-hydroxyethyl acrylate | 126.0 |
| Methacrylic acid monomer | 54.0 |
| 1-dodecanethiol | 21.6 |
| Methylethyl ketone | 692.0 |
| Acetone | 414.0 |
| Portion 2: | |
| Azo-isobutyronitrile | 21.6 |
| Methylethyl ketone | 274.0 |
| Total | 3223.2 |

Portion 1 is charged into a reaction vessel equipped with a stirrer, a thermometer, reflux condenser, nitrogen inlet, and a dropping funnel and the ingredients are heated to 78° C. About one-half of Portion 2 is then added and the reaction mixture is then held at its reflux temperature for about 1 hour. Then one-sixth of Portion 2 is added to the reaction mixture and the mixture is held at its reflux temperature for an additional hour. Then, an additional one-sixth of Portion 2 is added to the reaction mixture and the reaction mixture is maintained at its reflux temperature for an additional hour and ½, and then the remainder of Portion 2 is added and the reaction mixture is maintained at its reflux temperature for an additional 2 hours.

The resulting polymer solution has a polymer solids content of 55.6% and then the composition is diluted with methylene chloride to a 35% solids content. The polymer consists of methyl methacrylate/butyl acrylate/2-hydroxyethyl acrylate/methacrylic acid in a weight ratio of 70/20/7/3 and the polymer has a relative viscosity of 1.069 measured at 0.5% polymer solids at 30° C. in methylethyl ketone. The polymer has a calculated glass transition temperature of 48° C.

A polymer solution is prepared as follows:

| | Parts by weight |
|---|---|
| Methyl diethanol amine | 5.4 |
| "Cymel" 303 [hexa(methoxymethyl)melamine] | 30.0 |
| Cellulose acetate butyrate solution (25% solution of a cellulose acetate butyrate having a butyryl content of 45% and a viscosity of 1 second in a 2:1 mixture of toluene/acetone) | 160.0 |
| Polymer solution prepared above (35% solids) | 371.4 |
| Methylene chloride | 298.6 |
| Total | 865.4 |

The above ingredients are thoroughly blended together and filtered and the resulting composition has a 40 sec. viscosity in a No. 1 Zahn cup. The composition is spray dried as in Example 3 and the resulting powder is then dried in a vacuum oven and held at 30° C. The resulting powder is blended with 0.1% of finely divided silica by thoroughly shaking the powder and the silica for 30 minutes. The resulting powder is passed through a 200-mesh sieve and then dried to a constant weight in a vacuum oven maintained at 30° C.

Phosphatized steel panels primed with a conventional alkyd resin iron oxide primer are electrostatically sprayed with the novel powder composition using the procedure described in Example 1 and the panels are baked for 30 minutes at 175° C. The resulting films are clear and glossy and have a good appearance and do not contain bubbles due to popping.

EXAMPLE 6

| | Parts by weight |
|---|---|
| Polymer solution (55.6% solids prepared in Example 4) | 1512.8 |
| "Cymel" 303 [hexa(methoxymethyl) melamine] | 102.7 |
| Methyl diethanolamine | 35.2 |
| CAB solution (25% cellulose acetate butyrate having a 38% butyryl content and a viscosity of 2 seconds in methylethyl ketone) | 166.4 |
| CAB solution (25% cellulose acetate butyrate having a 55% butyryl content and a viscosity of 0.2 second in methylethyl ketone) | 82.2 |
| Butyl benzyl phthalate | 8.3 |
| Green mill base (prepared in Example 4) | 513.5 |
| "Afflair" flake (mica flake coated with titanium dioxide) | 20.2 |
| Total | 2441.3 |

The above ingredients are added in turn to a mixing vessel and then blended together with constant agitation and the resulting composition is thinned with methylene chloride to a 40-second viscosity measured in a No. 1 Zahn Cup. The composition is then filtered and spray dried using the procedure described in Example 3. The resulting powder is dried in a vacuum oven over a 16-hour period while the temperature is held at 30° C. The powder is then passed through a 20-mesh sieve and then blended with 0.1% by weight of a finely divided silica. The resulting powder is then passed through a 230-mesh sieve to remove large particles. The powder has excellent stability at 40° C.

Steel panels primed with a conventional alkyd resin iron oxide primer are electrostatically sprayed with the novel powder composition prepared above using the identical procedure of Example 1. The panels are then baked for 30 minutes at about 175° C. The resulting panels have an excellent appearance, good gloss, good distinctness of image, and excellent resistance to gasoline and aromatic solvents.

The invention claimed is:
1. A thermosetting acrylic polymer powder coating composition comprising finely divided particles having a particle size of 1–100 microns; wherein the powder particles are an intimately mixed blend of film-forming constituents that consist essentially of
  (A) 70–95% by weight of an acrylic polymer consisting essentially of
    (1) 30–83% by weight of methyl methacrylate,
    (2) 10–50% by weight of a soft constituent selected from the group consisting of an alkyl acrylate and an alkyl methacrylate where the alkyl groups have 2–12 carbon atoms,
    (3) 5–20% by weight of a hydroxy containing compound selected from the group consisting of a hydroxyalkyl acrylate and a hydroxyalkyl methacrylate wherein the alkyl groups contain 2–4 carbon atoms, and
    (4) 2–8% by weight of an $\alpha,\beta$-ethylenically unsaturated monocarboxylic acid; wherein at least 50% of the carboxyl groups are neutralized with an aliphatic amine having a boiling point of about 200–275° C.,
  wherein the acrylic polymer has a glass transition temperature of about 40–70° C. and the polymer has a relative viscosity of 1.05–1.20 measured at 0.5% polymer solids at 30° C. in methylethyl ketone;
  (B) 5–30% by weight of an alkylolated melamine formaldehyde having a ratio of —$CH_2OR$ groups to —$CH_2OH$ groups of at least 5:1 where R is an alkyl group having 1–8 carbon atoms.

2. The powder coating composition of claim 1 containing about 0.2–50% by weight of pigment.

3. The powder coating composition of claim 2 in which the acrylic polymer has a relative viscosity of 1.06–1.10 and a glass transition temperature of 40°–60° C. and in which the alkylolated melamine formaldehyde is hexa(methoxymethyl)melamine.

4. The powder coating composition of claim 3 in which the acrylic polymer consists essentially of
  65–75% by weight of methyl methacrylate,
  10–30% by weight of an alkyl acrylate having 2–4 carbon atoms in the alkyl group.
  5–12% by weight of hydroxy ethyl acrylate,
  2–5% by weight of methacrylic acid or acrylic acid.

5. The coating composition of claim 2 in which the film-forming constituents contain 1 to 25% by weight of cellulose acetate butyrate having a butyryl content of 30–60% by weight and a viscosity of 0.1–6 seconds measured at 25° C. according to ASTM-D-1343-56.

6. The powder coating composition of claim 5 in which the acrylic polymer is neutralized with an aliphatic amine selected from the group consisting of dibutylamino ethanol and methyl diethanolamine.

7. The powder coating composition of claim 2 in which the acrylic polymer consists essentially of 70% by weight of methyl methacrylate, 20% by weight of ethyl acrylate, 7% by weight of 2-hydroxyethyl acrylate and 3% by weight of methacrylic acid or acrylic acid.

8. The powder coating composition of claim 2 in which the acrylic polymer consists essentially of 70% by weight of methyl methacrylate, 20% by weight of butyl acrylate, 7% by weight of 2-hydroxyethyl acrylate and 3% by weight of methacrylic acid or acrylic acid.

9. The thermosetting acrylic polymer powder coating composition of claim 1 comprising finely divided particles having a particle size of 10–75 microns; where the powder particles are an intimately mixed blend of film-forming constituents that consist essentially of
  (A) 80–90% by weight of an acrylic polymer consisting essentially of
    (1) 65–75% by weight of methyl methacrylate,
    (2) 10–30% by weight of an alkyl acrylate having 2–4 carbon atoms in the alkyl group,
    (3) 5–12% by weight of hydroxy ethyl acrylate,
    (4) 2–5% by weight of methacrylic acid or acrylic acid;
  wherein the carboxyl groups are neutralized with an aliphatic amine selected from the group consisting of dibutyl amino ethanol and methyl diethanol amine;
  wherein the acrylic polymer has a glass transition temperature of about 40–60° C. and the polymer has a relative viscosity of 1.06–1.10 measured at 0.5% polymer solids at 30° C. in methylethyl ketone;
  (B) 10–20% by weight of hexa((methoxymethyl) melamine.

10. A process for preparing the powder coating composition of claim 1 which comprises:
  (1) neutralizing at least 50% of the carboxyl groups of the acrylic polymer with an aliphatic amine having a boiling point of about 200–275° C. by blending the amine with the dispersion or solution of the acrylic polymer;

(2) blending the solution or dispersion of Step (1) with the alkylolated melamine formaldehyde and optionally pigments, plasticizers and cellulose acetate butyrate;

(3) spraying and drying the composition prepared in Step (2) to form a powder coating composition.

References Cited

UNITED STATES PATENTS 3,637,546   1/1972   Parker _____ 260—15

WILLIAM H. SHORT, Primary Examiner
E. WOODBERRY, Assistant Examiner

U.S. Cl. X.R.

117—161 C, 161 UT; 260—39 R, 856